March 11, 1958 H. G. POOLE 2,826,433
TOW DEVICES BETWEEN TRACTIVE UNITS AND
VEHICLES TOWED THEREBY
Filed June 29, 1955 4 Sheets-Sheet 1

HAROLD G. POOLE
INVENTOR.

BY Wenderoth, Lind & Ponack

ATTYS.

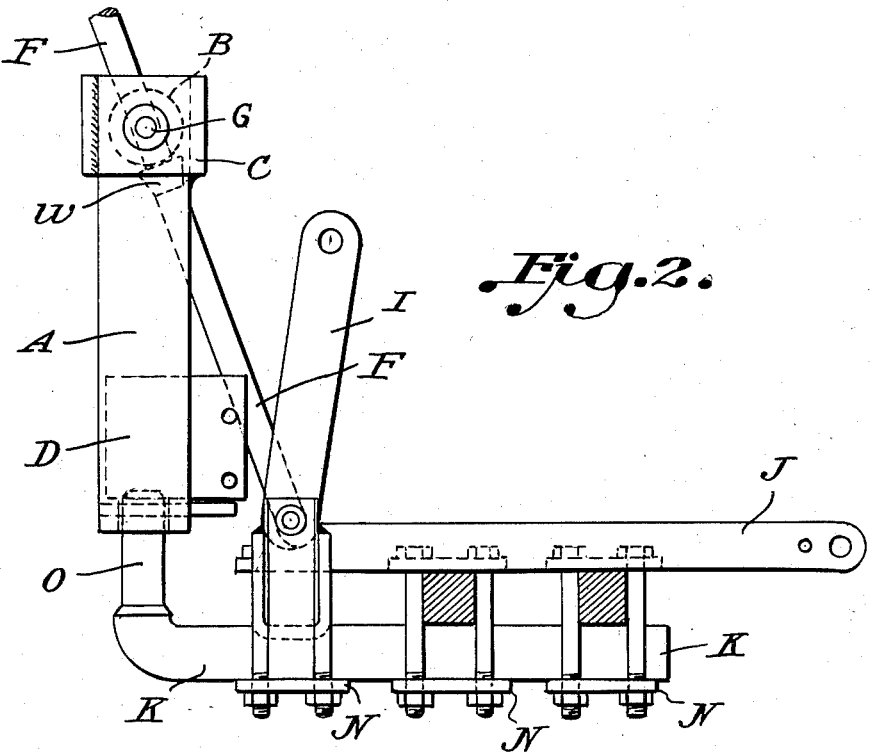
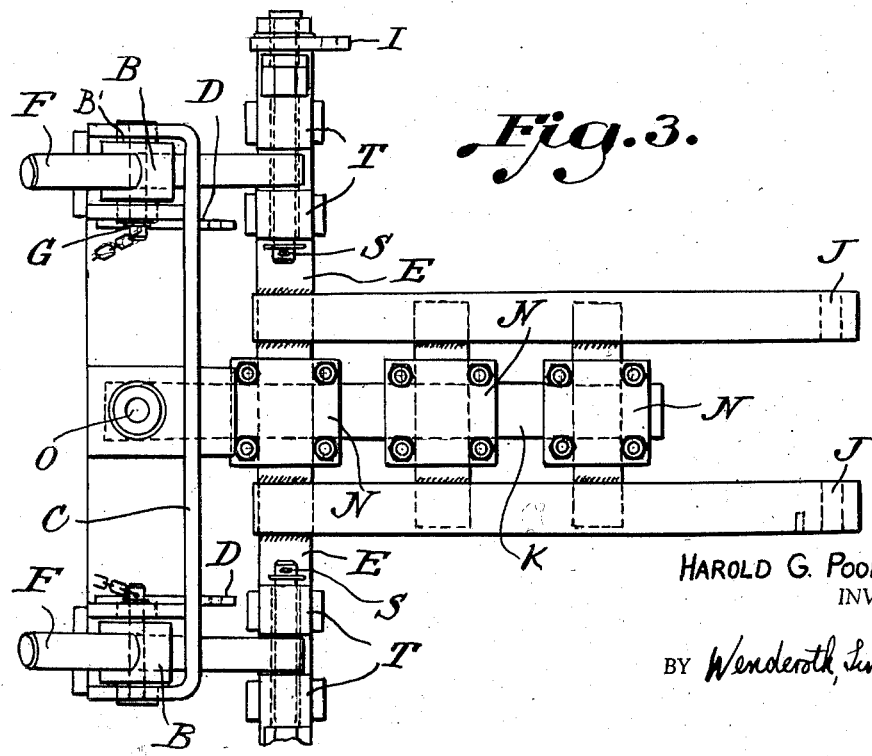

March 11, 1958

H. G. POOLE 2,826,433

TOW DEVICES BETWEEN TRACTIVE UNITS AND
VEHICLES TOWED THEREBY

Filed June 29, 1955

HAROLD G. POOLE
INVENTOR.

BY Wenderoth, Lind & Ponack

ATTYS.

March 11, 1958     H. G. POOLE     2,826,433
TOW DEVICES BETWEEN TRACTIVE UNITS AND
VEHICLES TOWED THEREBY
Filed June 29, 1955     4 Sheets-Sheet 4

HAROLD G. POOLE
INVENTOR.

BY Wenderoth, Lind & Ponack

ATTYS.

United States Patent Office 2,826,433
Patented Mar. 11, 1958

2,826,433

TOW DEVICES BETWEEN TRACTIVE UNITS AND VEHICLES TOWED THEREBY

Harold George Poole, Salisbury, Southern Rhodesia

Application June 29, 1955, Serial No. 518,890

6 Claims. (Cl. 280—479)

This invention relates to tow or hitch connections between tractive vehicles or tractors and trailers and the like hauled thereby, and has among its objects an improved tow or hitch connection which may be fitted inter alia to the majority of tractors having three point linkage, and may be coupled or uncoupled simply by actuation of the power lift without requiring the driver to leave his seat.

According to this invention a tow device of the kind referred to comprises a coupling, one part of which is arranged for connection with the tractive unit or vehicle, and mechanical means operable from a position on the tractor for inter-connecting the two parts of the coupling when they have been brought into an appropriate relationship and for disconnecting them when so desired. The term "towed vehicle" is intended to cover any device which it may be desired to tow or trail behind the tractor or tractive unit but is particularly intended to include non-self-balancing trailers or the like having wheels at the rear so that they are not only towed or trailed but are partly supported by the tractor through the coupling.

In the case where the tractive vehicle is provided with a power energised actuating mechanism which comprises a hydraulically actuated rock shaft extending transversely and horizontally from the tractor and having two lever arms extending therefrom, the coupling structure is disposed below the rock shaft and is coupled to the aforesaid lever arm by pivoted linkages.

The following is a more detailed description of one form of tow device according to the invention arranged for use with an agricultural tractor, reference being made to the accompanying drawings in which:

Figure 2 is a side elevation looking at the right of Figure 1.

Figure 3 is a plan of the tow device.

The tow device comprises an upright U-shaped frame A the two limbs of which are each provided near their lower extremities with a fixing plate D projecting forwardly from the frame, and arranged to be fixed securely to a part of the tractor. Secured across the upper extremities of the limbs of the U-shaped frame A is a horizontally disposed member C having flanges at its ends which are spaced outwardly of the limbs of the U-shaped member A, and pivotally connected between the flanges and limbs are sockets or swivel guides B.

Figure 5:
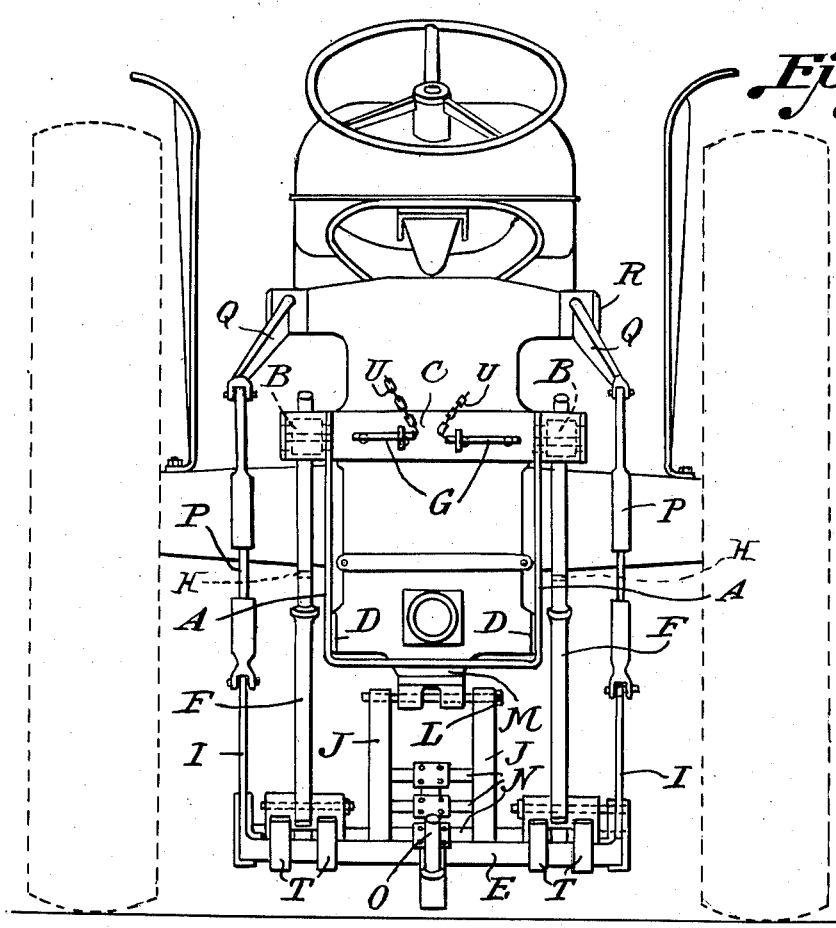
Figure 5 is a rear elevation of the tow device fitted to the tractor.
Figure 6:
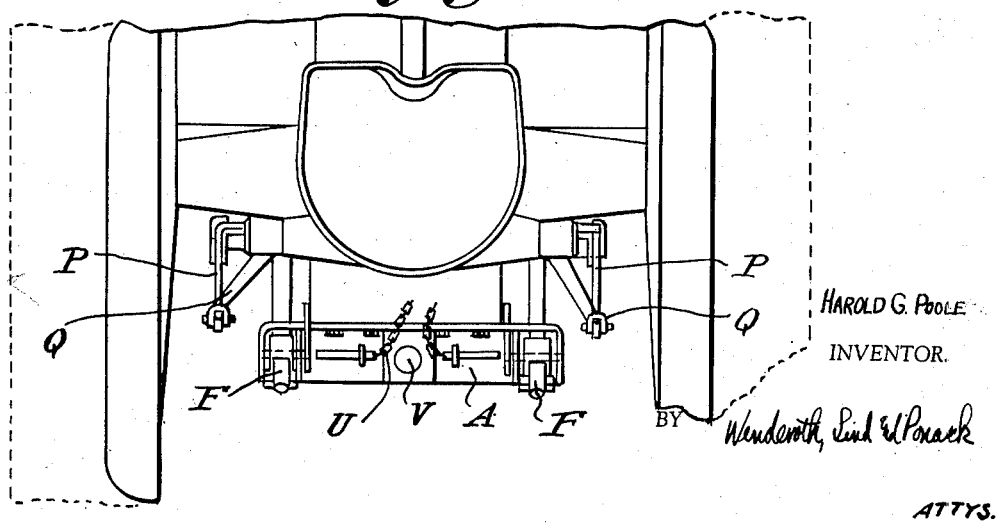
Figure 6 is a plan view of the arrangement shewn in Figures 4 and 5.

As best seen in Figures 3 and 5, two lever arms J are pivotally connected by a pin L to a fixed part M of the tractor which is forward of and beneath the U-shaped frame A and so as to extend rearwardly, and rigidly fixed to the rear end of these arms is a cross beam E. Fixed by clamps N between the arms J is a towing member K the rearward extremity of which is provided with an upstanding peg or pin O. The outer extremities of the beam E have secured thereto, arms I which are connected by links P to lever arms Q on a rock shaft R which may be oscillated by hydraulic means on the tractor, whereby the peg O may be raised or lowered.

The beam E has pivotally connected thereto, two upwardly extending shafts F which extend respectively through holes formed in the sockets or swivel guides B. The swivel guides B have hollow trunnions B' thereon which are rotatably mounted in the flanges of member C. The lower ends of the shafts are drilled to receive pivot pins S which extend through lugs T fixed to a beam E. A hole H is formed in each shaft F which may be brought into register with a hole H' in the trunnion of the socket or swivel guide when the pin or peg O has been raised to its uppermost position, and there is introduced into each of registering holes a locking pin G which may be tethered to a part of the tractor by a chain U.

Figure 1:
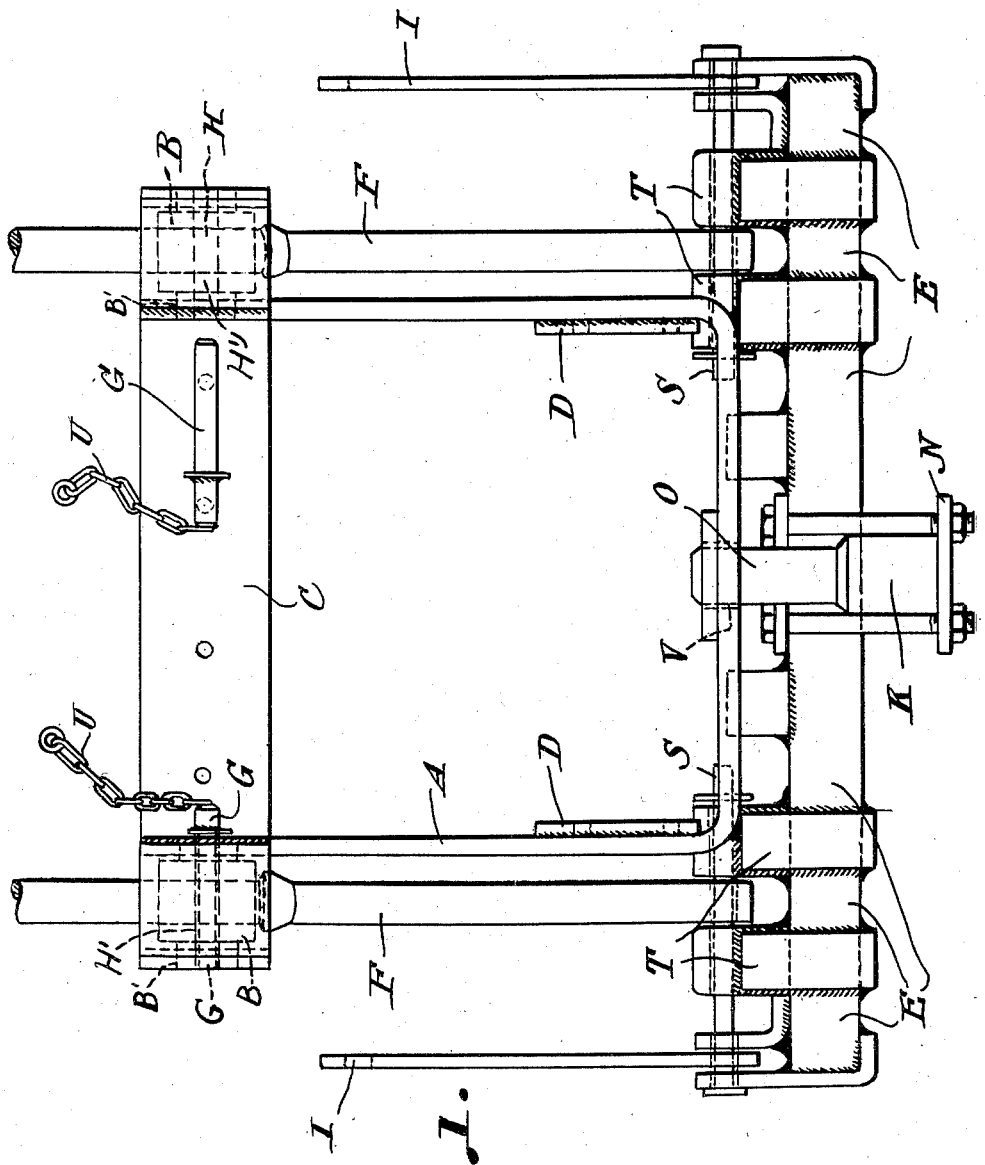
Figure 1 is a rear elevation of the tow device.
Figure 4:
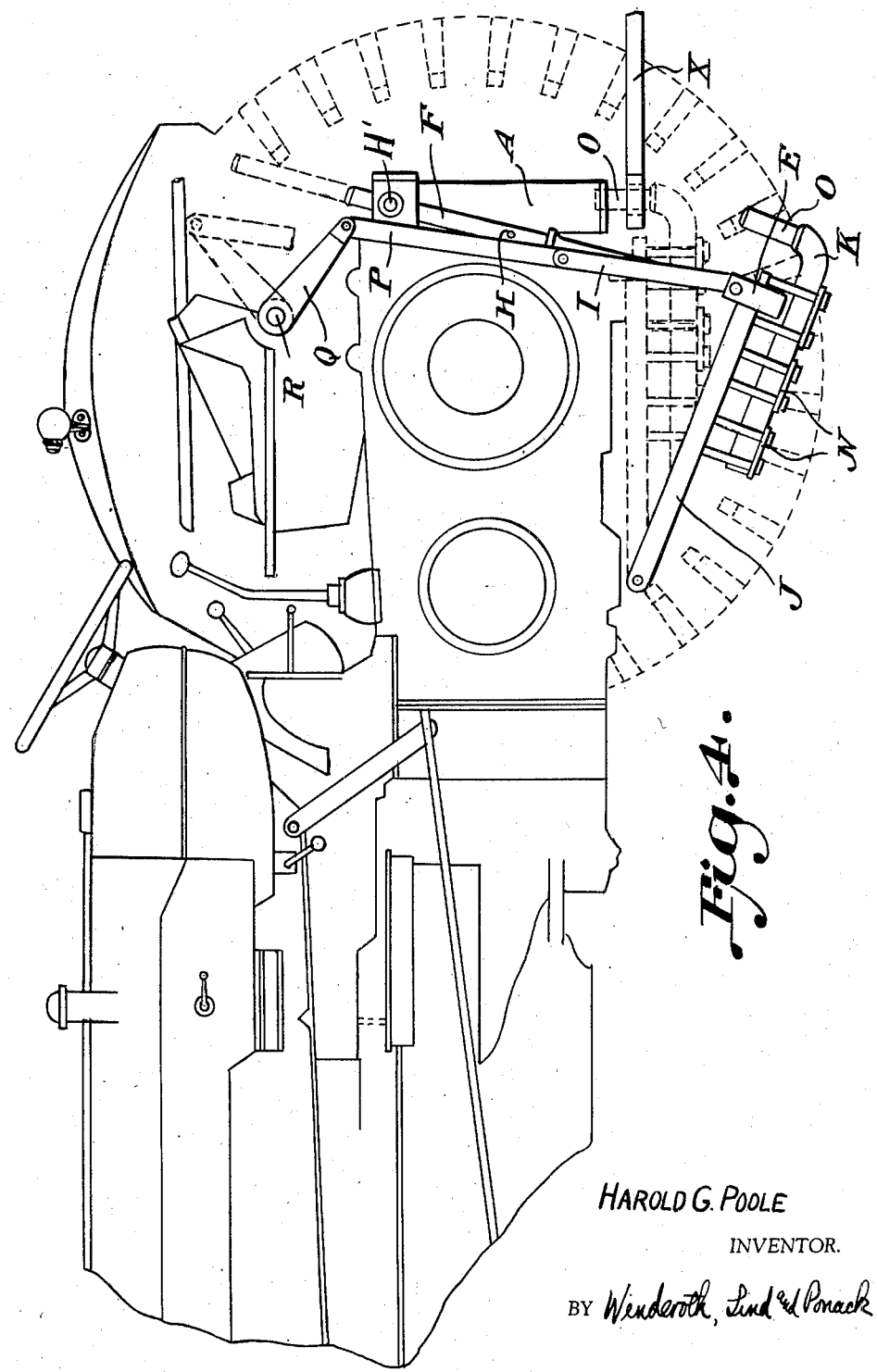
Figure 4 is a side elevation and part sectional view of the tow device as fitted to a tractor, and shewing one part of the coupling at the upper and lower limits of its movement.

The pin or peg O in moving to its upper position extends through a hole V formed in the bottom of the U-shaped member A. In order to assist in registration of the hole H in each shaft F and the hole H' in the socket or swivel guide B each shaft F may be provided with an abutment W which abuts the underside of the socket when the holes are in register. Since this position also coincides with the uppermost position of the towing member with respect to U-shaped member A, the abutment also constitutes means for limiting the upward movement of the towing member with respect to member A. The draw bar X (see Figure 4) connected to the towed vehicle may be provided with an eye Y at its forward extremity, which is engaged by the pin of peg O before the latter extends into the hole in the bottom of the U-shaped frame member A.

Having now particularly described and ascertained the nature of my said invention and in what manner the same is to be performed I declare that what I claim is:

1. For attachment to a tractive vehicle having power actuated mechanism including a transversely arranged rockshaft with oscillating arms thereon, a tow device comprising a U-shaped frame attachable rigidly in an upright position to a rear part of the tractive vehicle and having a hole in the center of the bottom thereof, a horizontally disposed member across the ends of the upright arms of the U-shaped frame, swivel guides pivotally connected at the opposite ends of the horizontal member, lever arms pivotally connectable to the tractive vehicle below and forward of said U-shaped frame and extending rearwardly beneath said U-shaped frame, a transverse beam connecting the free ends of the lever arms, a linkage between the rockshaft arms and the lever arms for raising and lowering the lever arms, a towing member secured to and projecting rearwardly from the beam and having a pin thereon adapted to pass upwardly through a hole in a drawbar on the towed vehicle into the hole provided in the bottom of the U-shaped frame thereby completing the hitching operation, and shafts having their lower ends pivoted to the beam and passing upwardly through and slidably within said swivel guides for providing lateral stability of said transverse beam.

2. A tow device as claimed in claim 1 and means on said shaft for limiting the upward movement of the towing member with respect to the U-shaped frame after the pin has entered the hole in said U-shaped frame.

3. A tow device as claimed in claim 2 in which said movement limiting means comprises stop means on said shafts abutting against said swivel guides.

4. A tow device as claimed in claim 1 and means locking said shafts relative to said swivel guides for locking the towing member against unwanted raising or hitching, or lowering or unhitching movements.

5. A tow device as claimed in claim 4 in which said shafts have holes formed in suitable positions therein and said swivel guides have holes formed therethrough, and pins for insertion through the holes when they are aligned, said pins cooperating with said aligned holes to form the locking means.

6. A tow device as claimed in claim 5 in which said locking means are located within operating reach of the driver's seat on the traction vehicle.

References Cited in the file of this patent

UNITED STATES PATENTS

| | | |
|---|---|---|
| 1,500,236 | Cochran | July 8, 1924 |
| 2,544,181 | Richey | Mar. 6, 1951 |
| 2,685,456 | Black | Aug. 3, 1954 |